United States Patent [19]

Kekas et al.

[11] 3,754,216

[45] Aug. 21, 1973

[54] POSITION INDICATING AND CONTROL SYSTEM

[75] Inventors: Dennis H. Kekas; Lubos R. Palounek, both of Raleigh, N.C.

[73] Assignee: International Business Machines Corporation, Armonk, N.Y.

[22] Filed: Dec. 21, 1971

[21] Appl. No.: 210,449

[52] U.S. Cl. .............................................. 340/172.5
[51] Int. Cl. ........................ G11b 5/78, G11b 11/00
[58] Field of Search ......................... 340/172.5, 347; 235/154

[56] References Cited

UNITED STATES PATENTS

| | | | |
|---|---|---|---|
| 3,582,897 | 6/1971 | Marsh | 340/172.5 |
| 3,644,897 | 2/1972 | McCrea | 340/172.5 |
| 3,593,314 | 7/1971 | Moll | 340/172.5 |
| 3,656,427 | 4/1972 | Foley | 340/172.5 |
| 3,668,647 | 6/1972 | Evangelisti | 340/172.5 |
| 3,689,891 | 9/1972 | Kril | 340/172.5 |
| 3,611,314 | 10/1971 | Pritchard | 340/172.5 |
| 3,629,860 | 12/1971 | Capozzi | 340/172.5 |
| 3,594,735 | 7/1971 | Furlong | 340/172.5 |
| 3,525,080 | 8/1970 | Couleur et al. | 340/172.5 |

*Primary Examiner*—Paul J. Henon
*Assistant Examiner*—Paul R. Woods
*Attorney*—Edward H. Duffield et al.

[57] ABSTRACT

Method and apparatus for indicating the present position of any location on a movable medium with respect to a fixed location is disclosed in which each location is arbitrarily assigned a data content of at least one bit and an address comprised of a plurality of bits made up of the data content from the location and from at least one adjacent location. Serially generated data bits are compared against desired location addresses for which position information is desired.

10 Claims, 10 Drawing Figures

FIG. 3

$W_2$

0 | 0 | 0 | 0 | 1 | 0 | 1 | 0

$W_1$

| | | | | | | |
|---|---|---|---|---|---|---|
| 01 | A | 0 | 0 | 0 | 0 | 1 |
| 02 | B | 0 | 0 | 0 | 1 | 0 |
| 03 | C | 0 | 0 | 1 | 0 | 1 |
| 04 | D | 0 | 1 | 0 | 1 | 0 |
| 05 | E | 1 | 0 | 1 | 0 | 1 |
| 06 | F | 0 | 1 | 0 | 1 | 1 |
| 07 | G | 1 | 0 | 1 | 1 | 1 |
| 08 | H | 0 | 1 | 1 | 1 | 0 |
| 09 | I | 1 | 1 | 1 | 0 | 1 |
| 10 | J | 1 | 1 | 0 | 1 | 1 |
| 11 | K | 1 | 0 | 1 | 1 | 0 |
| 12 | L | 0 | 1 | 1 | 0 | 0 |
| 13 | M | 1 | 1 | 0 | 0 | 0 |
| 14 | N | 1 | 0 | 0 | 0 | 1 |
| 15 | O | 0 | 0 | 0 | 1 | 1 |
| 16 | P | 0 | 0 | 1 | 1 | 1 |
| 17 | Q | 0 | 1 | 1 | 1 | 1 |
| 18 | R | 1 | 1 | 1 | 1 | 1 |
| 19 | S | 1 | 1 | 1 | 1 | 0 |
| 20 | T | 1 | 1 | 1 | 0 | 0 |
| 21 | U | 1 | 1 | 0 | 0 | 1 |
| 22 | V | 1 | 0 | 0 | 1 | 1 |
| 23 | W | 0 | 0 | 1 | 1 | 0 |
| 24 | X | 0 | 1 | 1 | 0 | 1 |
| 25 | Y | 1 | 1 | 0 | 1 | 0 |
| 26 | Z | 1 | 0 | 1 | 0 | 0 |
| 27 | | 0 | 1 | 0 | 0 | 1 |
| 28 | | 1 | 0 | 0 | 1 | 0 |
| 29 | | 0 | 0 | 1 | 0 | 0 |
| 30 | | 0 | 1 | 0 | 0 | 0 |
| 31 | | 1 | 0 | 0 | 0 | 0 |

FIG. 6

| FIR | | | | | | BIR | | | | |
|---|---|---|---|---|---|---|---|---|---|---|
| 4 | 3 | 2 | 1 | 0 | | 0 | 1 | 2 | 3 | 4 |
| 0 | 0 | 0 | 1 | 1 | | 0 | 0 | 0 | 1 | 1 |
| ← | | | | | | → | | | | |
| 0 | 0 | 0 | 0 | 1 | | 0 | 0 | 1 | 0 | 0 |
| 0 | 0 | 0 | 1 | 0 | | 1 | 0 | 0 | 1 | 0 |
| 0 | 0 | 1 | 0 | 1 | | 0 | 1 | 0 | 0 | 1 |
| 0 | 1 | 0 | 1 | 0 | | 1 | 0 | 1 | 0 | 0 |
| 1 | 0 | 1 | 0 | 1 | | 1 | 1 | 0 | 1 | 0 |
| 0 | 1 | 0 | 1 | 1 | | 0 | 1 | 1 | 0 | 1 |
| 1 | 0 | 1 | 1 | 1 | | 0 | 0 | 1 | 1 | 0 |
| 0 | 1 | 1 | 1 | 0 | | 1 | 0 | 0 | 1 | 1 |
| 1 | 1 | 1 | 0 | 1 | | 1 | 1 | 0 | 0 | 1 |
| 1 | 1 | 0 | 1 | 1 | | 1 | 1 | 1 | 0 | 0 |
| 1 | 0 | 1 | 1 | 0 | | 1 | 1 | 1 | 1 | 0 |
| 0 | 1 | 1 | 0 | 0 | | 1 | 1 | 1 | 1 | 1 |
| 1 | 1 | 0 | 0 | 0 | | 0 | 1 | 1 | 1 | 1 |
| 1 | 0 | 0 | 0 | 1 | | 0 | 0 | 1 | 1 | 1 |
| 0 | 0 | 0 | 1 | 1 | | 0 | 0 | 0 | 1 | 1 |
| 0 | 0 | 1 | 1 | 1 | | 1 | 0 | 0 | 0 | 1 |
| 0 | 1 | 1 | 1 | 1 | | 1 | 1 | 0 | 0 | 0 |
| 1 | 1 | 1 | 1 | 1 | | 0 | 1 | 1 | 0 | 0 |
| 1 | 1 | 1 | 1 | 0 | | 1 | 0 | 1 | 1 | 0 |
| 1 | 1 | 1 | 0 | 0 | | 1 | 1 | 0 | 1 | 1 |
| 1 | 1 | 0 | 0 | 1 | | 1 | 1 | 1 | 0 | 1 |
| 1 | 0 | 0 | 1 | 1 | | 0 | 1 | 1 | 1 | 0 |
| 0 | 0 | 1 | 1 | 0 | | 1 | 0 | 1 | 1 | 1 |
| 0 | 1 | 1 | 0 | 1 | | 0 | 1 | 0 | 1 | 1 |
| 1 | 1 | 0 | 1 | 0 | | 1 | 0 | 1 | 0 | 1 |
| 1 | 0 | 1 | 0 | 0 | | 0 | 1 | 0 | 1 | 0 |
| 0 | 1 | 0 | 0 | 1 | | 0 | 0 | 1 | 0 | 1 |
| 1 | 0 | 0 | 1 | 0 | | 0 | 0 | 0 | 1 | 0 |
| 0 | 0 | 1 | 0 | 0 | | 0 | 0 | 0 | 0 | 1 |
| 0 | 1 | 0 | 0 | 0 | | 1 | 0 | 0 | 0 | 0 |
| 1 | 0 | 0 | 0 | 0 | | 0 | 1 | 0 | 0 | 0 |

POSITION INDICATING AND CONTROL SYSTEM

BACKGROUND OF THE INVENTION

This invention relates to serial printers in which desired characters located at various positions on a movable medium must be located and positioned for printing. It also relates to the field of linear positioning and control apparatus such as XY indexing devices. More specifically, the invention relates to serial chain and belt types of printing devices and to the hammer firing control mechanisms and circuits therefor.

PRIOR ART

While position indicating devices and print hammer fire control circuits and mechanisms have previously been built in a variety of styles, designs, and technologies, all have suffered from one or more shortcomings. For example, a typical print hammer fire control apparatus known in the prior art utilizes a coded emitter wheel or other pulse generating device attached to the drive apparatus for the moving print element. The emitter is provided with a series of data bits for each print position or character on the medium. The data bits or the encoding signals from other devices are sensed by a plurality of sensors and, when the desired code is found, a fire signal is given. Since it is the usual case that each character appears only one place on the medium, only one character can be printed at a time unless multiple print hammers are provided together with complicated and expensive timing and logic and drive apparatus therefore, or the print medium is provided with multiple columns of characters. This results in an unnecessary and expensive amount of duplication in design and gives rise to a number of possible failures in the proliferation of circuits and mechanisms. Additionally, the sensing devices used to sense the code permutations which identify characters have traditionally been either magnetic, optical, or mechanical and have been subject to various types of failures. It is inherent in the plural bit multiple sensor type of design that a failure in any one of the sensors creates and propagates errors in the control of the apparatus. Maintenance of multiple sensors, adjustment thereof, and the inherent susceptibility to failure present in the number of sensors required, is a definite problem in many types of prior devices.

While single hammer printers have been built using only a single sensor and a counter to determine the position of various character positions on the movable medium, this design necessitates rapid movement of the print carrier in order to accomplish a high speed print output since only one character may be printed in each pass of the print carrying medium in front of the hammer. This design requires an extremely precise coordination between the counting means and the print hammer since the carrying medium moves at a high velocity. Slight errors in timing, sensing and synchronization will cause error in the output result. An additional deficiency with this type of design is that the identification of each character requires the serial sensing of a coded number comprised of a plurality of bits, for example four or five, before a new character can be identified and once it has been identified then an additional similar number of bits must be sensed again. This is a process which is inherently slower than is desirable in responding to the demands of reproducing a single character at two adjacent print locations.

Previous indexing systems, print control apparatus, and table search devices have utilized parallel logic circuitry to sense a plurality of code bits and compare them against a desired address. These devices require expensive and complicated circuitry to sustain the parallel logic system. They suffer from the same difficulty, if applied to chain or belt devices, as serial printers in general in that only one character can be printed at a time. This is true even if parallel logic is used to eliminate the time lag between sensing a number of bits in serial form. To implement this type of design for a multiple character at a time printer, requires a great amount of expensive electronic circuitry and, because of its complexity, is subject to a variety of troublesome failures.

A problem in the related field of numerical control positioning devices is that digital position signals from a programming device must be decoded and converted into another form for driving a positioning device. Assuming that the positioning device may be driven, an analog signal to drive the moving mechanism to a desired location is necessary. Alternatively, it requires that an analog drive signal be compared with signals coming from an encoding means which continuously signals the position of the moving element. The transformation of an incoming signal indicating the position to which movement is desired into an output analog position signal which directs the moving element to the desired location is an inherent source of error in the positioning system. Actual determination of present position is also subject to a variety of errors in the position encoder. The construction of position encoding indicators, such as shaft position encoders, is a continual source of problems since achieving high resolution in the measurement of incremental travels often requires delicate and sensitive mechanisms which can get out of proper calibration and which are subject to a variety of mechanical problems of their own.

OBJECTS OF THE INVENTION

An object of this invention is to improve the manner of locating positions on a movable medium.

It is also an object of this invention to improve multiple hammer printer control apparatus by reducing the number of position sensors required.

Still another object of this invention is to improve the coding technique used to identify and locate various positions on a medium.

A further object of this invention is to improve devices for locating and reaching a given position on a medium.

Still another object of the invention is to simplify and reduce the numbers of circuit and control devices to provide an improved location system having higher reliability and lower maintenance.

Another object of the invention is to improve the manner of locating a given position on a movable medium by taking the shortest distance from the present location to the new location in a bidirectionally movable medium.

SUMMARY OF THE INVENTION

The foregoing and other objects of the invention are achieved by implementing a maximum length code scheme in a position control device which receives input from a single sensor or from a stream of serial data bits generated in correspondence to the movement of the medium. The incoming sensor or bit data is temporarily stored. It is then compared against an address for the location for which position information is desired. The address consists in part of the bit data from the desired location, and in part of bit data from one adjacent location. Various locations may thus be distinguished from each other with a minimum of data. This facilitates rapid identification of a given address in a serially generated stream of bit data. In one embodiment of the invention, shift register devices are utilized to temporarily store a plurality of data bits sufficient to define more than one address, and the contents of the register are compared with more than one desired address on a time sharing basis so that more than one print hammer in a printer may be controlled by a single sensor. In another embodiment of the invention, opposing bit stream generators are operated to create an "image" of the movable medium in both a forward and backward direction from its initial position. The desired address is compared against both generated bit streams to locate the shortest route to the desired location.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 3 illustrates the maximum length code utilized in this invention.

FIG. 6 illustrates a stream of code generated by the device shown in FIG. 5.

As the invention is capable of being implemented in a variety of ways, and in both unidirectional and in bidirectional positioning systems, two embodiments will be discussed. For clarity, the simpler embodiment of the invention as applied to a unidirectional position locating system for a belt or chain printer will be discussed; but it should be understood by those of skill in the art that the specific moving medium for which position location is desired might be an index device on a machine tool moving relative to a workpiece or to a table. The commonality is that it is relative motion between a fixed point and a moving point which is the variable to be controlled.

Figure 1:
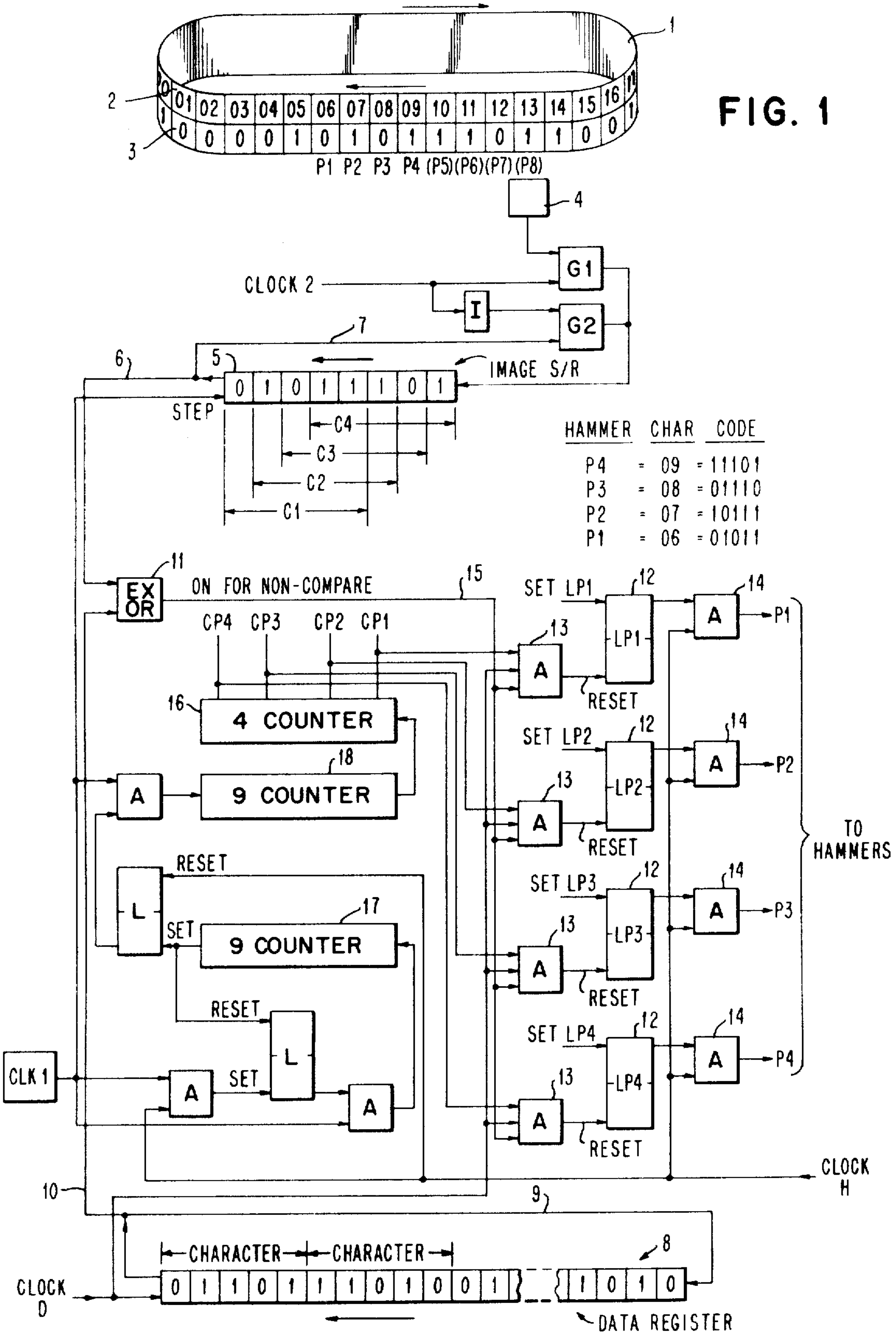
FIG. 1 illustrates in schematic form the basic invention as embodied in a chain or belt printer control system.

Turning now to FIG. 1, an embodiment of the invention as applied to a belt printer mechanism is illustrated in schematic form. This printer operates by moving a type-slug carrying belt or chain in front of at least one print hammer which either impacts the chain against a medium to print the specific character in that location, or drives the paper against the character at that location. Since the belt is moving continually, synchronization, identification of the desired character location, and actuation of the print hammer must be both extremely precise and fast if desirable output in the form of printed matter is to be produced with suitable speed and accuracy.

Character belt 1 is illustrated as being divided into two segments. The upper segment, for purposes of explanation, is depicted as carrying a string of data characters which may be of any desired shape or format and in any sequence thought desirable. In the preferred embodiment, however, it is most desirable to arrange the characters in a sequence which eliminates code conversions from, say, EBCDIC or ASCII to the printer character code. These are indicated as characters 2. The lower segment of the belt is designated as 3 and is depicted as carrying a string of digital data bits which are, for clarity, shown as ones and zeros although they would be magnetically or optically encoded in practice and would not ordinarily be visible as ones and zeros. However, the code bits could be etched on the belt in a visible form for reluctance pickup sensing or optical, mechanical, ultrasonic, or other sensing. A sensor 4 is indicated in conjunction with a given point in the path adjacent to belt 1 and may be magnetic, optical, mechanical, or any desired type. Sensor 4 is adapted to read the data on the digital data track 3 and input it through gate 1, identified as G1 in the drawing, into an image shift register 5. This is done at appropriate times as controlled by clock signal 2. Image shift register 5 is seen to contain an "image," in digital form, of the data carried on the section of the belt which has already passed sensor 4 in the direction of travel indicated by the arrow on belt 1. Image shift register 5 outputs data to a logic circuit over line 6 and simultaneously feeds back its output data over line 7 through gate 2, designated as G2 in the drawing. As shown, clock signal 2 is inverted before it is applied to G2 so that when the clock signal 2 is present, only G1 will pass the signal while G2 will block output from the shift register being returned to the input side of the shift register. The purpose of this will be discussed later. Returning now to the belt, print locations identified as P1, P2, etc., are shown beneath the belt. These should be understood to be positions occupied by striking hammers which may be actuated to impact the characters which may be in front of the hammers at these locations. For purposes of this discussion, only print hammers P1 through P4 will be discussed, but the discussion applies equally to the hammers P5 thorugh P8 shown in parentheses and to all other hammer groups which may be provided. Image shift register 5 can be seen to contain images of the data bits which appear at print positions P1 through P8. For the purposes of the code scheme which will be discussed shortly, five data bits are taken as a given address to define a character. The coding scheme is such that the eight data bits in image shift register 5 are sufficient to define addresses for characters located in front of print hammers 1 through 4 in an overlapped fashion.

In FIG. 3 it can be seen that character addresses consisting of five bits each differ one from another by only one "window position." That is, if one envisions a string of 8 bits, for example, which can be looked at in groups of 5 bits through a "window," each time the window is moved by 1 position, a new series of 5 bits is seen which differs from the previous 5 bits in the relative location of ones and zeros. Therefore, each incoming new bit of data from belt 1 through sensor 4 can be utilized to define a whole new 5 bit address, since the entry of a new bit shifts the register and changes the view through the "window." It should be borne in mind that while this discussion has utilized five bit addresses as an example, more or less bits would be required if more or fewer characters are desired to be defined.

Turning now to FIG. 3, an arbitrary code designation for characters 1 through 31 (A through Z and five unassigned) is illustrated. As will be observed, this code is unique in that each given code address of five bits differs from its adjacent codes by only one "window" position $W_1$, $W_2$, etc. It is obvious that the sensor 4 could read more than one bit at each character location on belt 1, without departing from this general coding scheme if it were so desired. This code technique is described as a maximum length code and, although it has the same capacitiy as binary code of the same number of bits, does not progress in the same fashion.

Returning now to FIG. 1, it will be noticed that a clock signal clock 1 is shown as being applied to image shift register 5. This signal steps the shift register 5, for purposes of this discussion, from right to left. The data contained in the left-most stage is outputted onto lines 6 and 7 when the clock pulse clock 1 activates the shift register 5. Data register 8 is shown as having an arbitrary sequence of codes loaded into it and may contain a number of 5 bit character designations. This shift register is driven by another clock signal, clock D, from right to left. It outputs its data onto lines 9 and 10. The data on lines 6 and 10 is compared in the Exclusive OR circuit 11 which outputs a signal if the data is not the same on line 6 and line 10. This comparison is made in a bit by bit fashion. A non-comparison signal is used to reset any of the various flip-flops or latches 12 which may have been previously set. Latches 12 are set in response to clock signals LP1 through LP4 whose timing and function will be discussed further when the timing chart is discussed. AND gates 13 allow reset pulses coming from Exclusive OR 11 to reach latches 12 only at specified times, as will also be discussed later. The output of latches 12 is fed to AND gates 14 which are used, when a pulse from clock H is present, to fire any of hammer drivers P1 through P4. Only such of those hammers as may be directed by latches 12 operating in conjunction with AND gates 13 are actuated. Conditional reset clock pulses CP1 through CP4, used to reset latches 12 via AND gates 13, are generated by a counter 16 which is advanced once every nine pulses of clock 1 by a circuit which may be constructed as shown in FIG. 1. Numerous other clock timing generators may be constructed to serve this function, such as shift registers, and other similar means.

Figures 2, 2B:
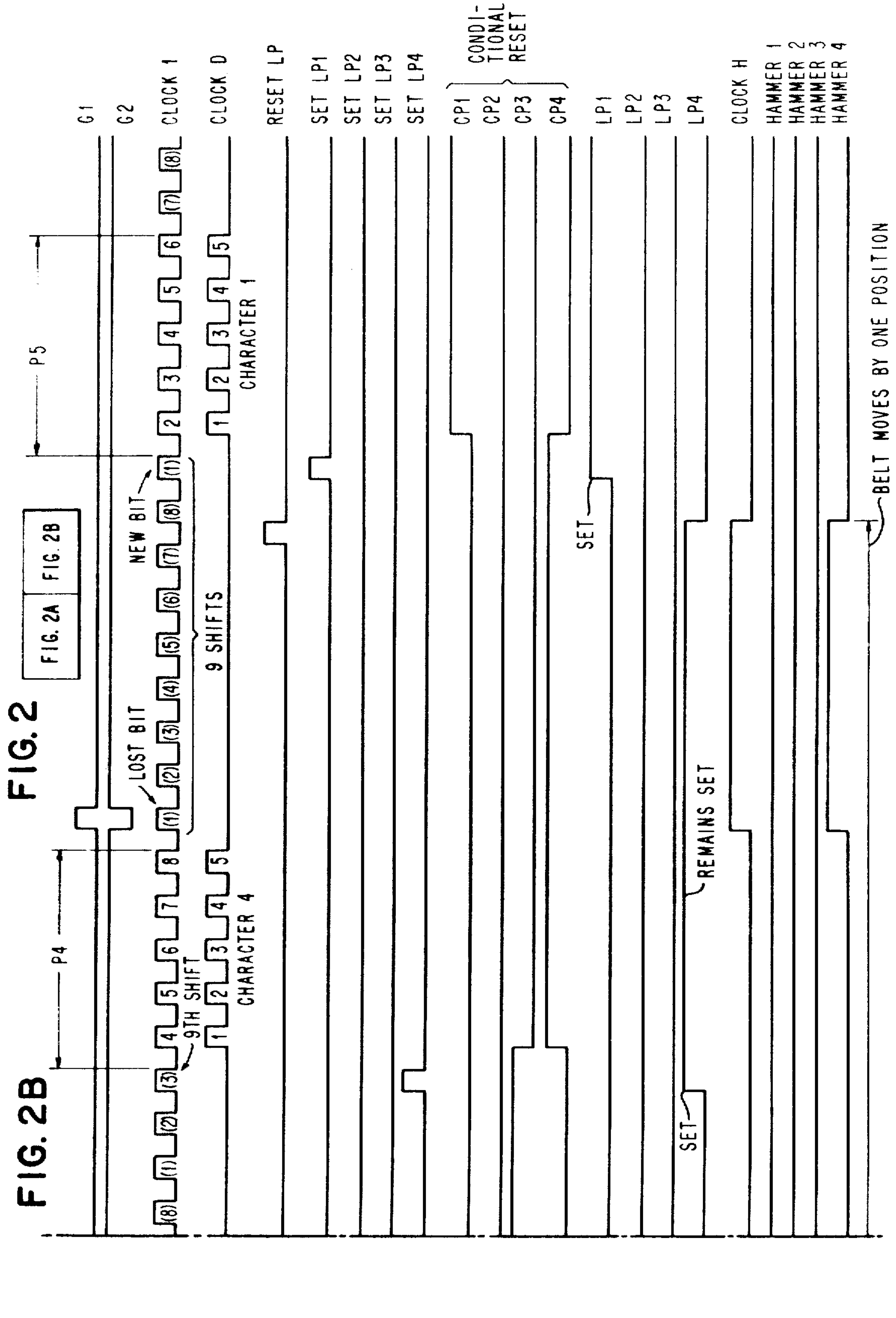
FIG. 2 consisting of FIGS. 2A and 2B, illustrates the timing sequence for the schematic in FIG. 1.
Figure 2A:
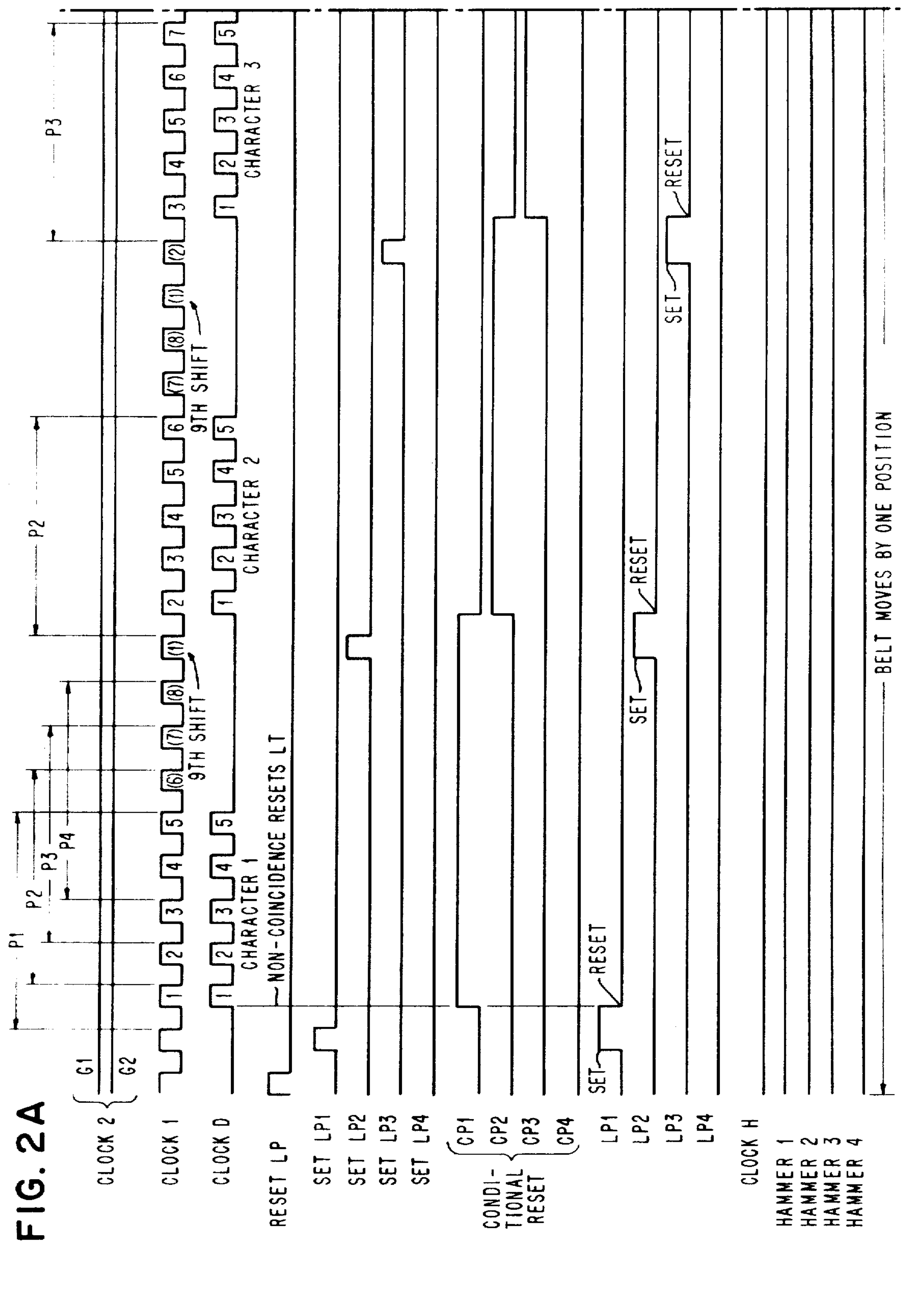

Turning now to FIG. 2, the relative timing of the various clocks which control the operation of the system will be discussed. Referring to FIG. 2, clock pulse train 1, (clock 1) which drives the image shift register 5, is seen to be a repetitive series of square wave pulses yuch as those produced by an ordinary digital oscillator. From this signal, the various other "clocks" are derived as various combinations of the counts produced by basic clock, clock 1. Circuits for doing this are well-known in the art and may consist simply of a counter which is started at a prescribed time, steps once for each clock pulse from clock 1, and outputs a signal at the end of some specified count period. In FIG. 1, counters 16, 17 and 18 serve such a purpose. Beginning from the left of FIG. 2 at the top, (clock 1), it can be seen that the number of clock pulses necessary to move a 5 bit character into the image shift register is five. It can also be seen that the first eight clock pulses will succeed in moving enough data bits through the image shift register 5 to define four 5-bit characters as they exist at this instant in time in front of print hammers P1 through P4. This shifting occurs very rapidly and the belt moves only a fraction of a single character spacing during the period this entire shift operation takes place. This is shown at the bottom of FIG. 2. During the first five pulses of clock 1, the first character from the data register 8, consisting of the first five bits in the data register 8, is serially compared with the corresponding five bits coming from the image shift register 5. During the shifting of image register 5, gate G2 is in its normally open condition, which means that the output signals from register 5 which appear on line 7, are free to reenter shift register 5 at the right end. This saves these bit signals for the next comparison sequence. Just prior to this comparison, all of the hammer firing latches 12 are reset by a pulse RESET LP which appears every 42nd clock pulse from clock 1 and the latch 12 for the hammer position P1 is set by pulse LP1.

During this comparison time, a signal is present from counter 16 in FIG. 1. This signal is shown as CP1 and is applied to one of the AND gates 13 which feeds its output to latch 12 for hammer P1. The counter 16 is stepped once for every nine pulses of clock 1, which is once for every character comparison period. If any of the first 5 bits from the image shift register 5 and and from data shift register 8 do not compare, the Exclusive OR 11 will output a pulse on line 15 which will pass through on whichever of the gates 13 has been conditioned by clock pulses CP1 through CP4 which will result in an output pulse from the affected gate 13 being applied to reset the latch 12 to which it is connected. This will prevent the firing of the hammer associated with the specific latch 12 when the clock pulse H is applied to fire the hammers. Image shift register 5 is shifted nine times for each character comparison cycle, or N + 1 times where N is the number of stages in shift register 5, to present the image of the character code on the belt as it now exists in front of print hammer position P2. This creates a new stream of 5 data bits at the output of shift register 5 for comparison with the next succeeding character in data register 8. In the specific embodiment illustrated, this entire operation is repeated four times before the belt 1 has moved by one position. When the belt has moved by one position, a new data bit from sensor 4 is added through gate G1 controlled by the clock 2. Then the shift register 5 is shifted to create an image of the belt as it appears shifted to the left by one position, with the new bit coming in at the right most location in the register. The bits appear at pulses designated as number 2 through number 8 in FIG. 2B, positioned above the portion designated as "character 1." A continuously changing stream of bits in image shift register 5 is thus compared in sequences of five bits against characters in data register 8. Data register 8 is controlled by clock D and is stepped five times, and is then stopped for four pulses of clock 1 so that the next comparison will bring up the next character in data register 8 and the image register 5. Clock D also controls AND gates 13 so that non-comparison signals resulting from the four additional shifts of register 5 will not affect the condition of latches 12. After four comparisons, the hammers, if any, whose firing latches have remained set, due to the occurrence of a complete match between five bits, are fired and those characters are printed.

As illustrated in FIG. 2, a hypothetical complete match occurred for hammer 4 and it was fired by the fire hammer signal of claock H after the final bit of the 4th character was compared.

Figure 4:
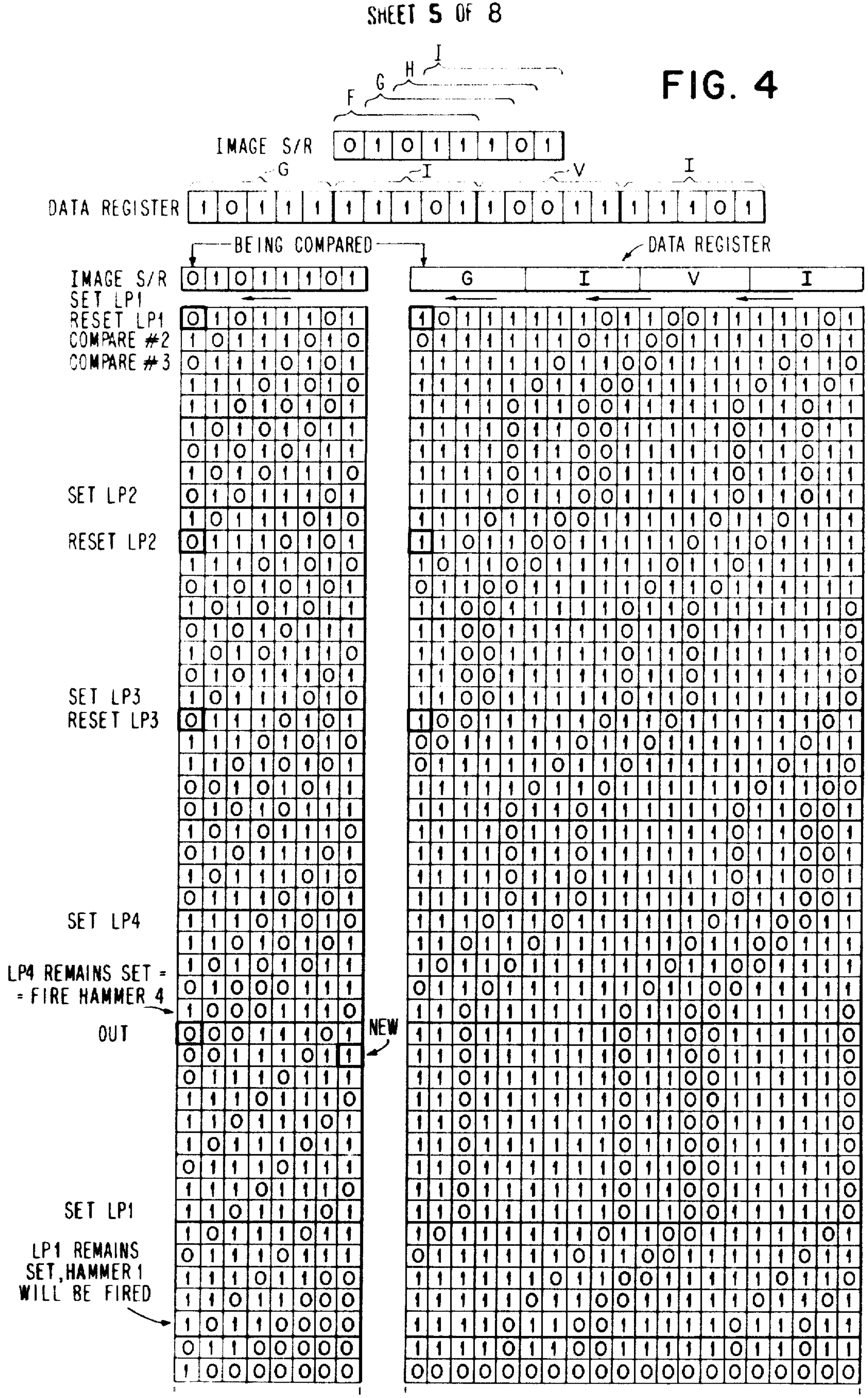
FIG. 4 illustrates the states of the image and data shift registers during a sequence of steps in an example operation.

As an illustrative example of the mode of operation of the device as depicted in FIG. 1, assume that the word "GIVING" must be printed and that the type belt is in the position indicated in FIG. 1 with the coding of characters as indicated in FIG. 3. With the belt in the position shown in FIG. 1, the overlapped address codes for the characters F, G, H and I appear in order from left to right in the image shift register 5. Data register 8 as depicted in FIG. 4 would be loaded with a "G" (10111) in the first character position, an "I" (11101) in the second, a "V" (10011) in the third, and another "I" (11101) in the fourth to make up the characters "GIVI." The function of the circuitry illustrated in FIG. 1 may now be explained by the chart shown in FIG. 4 which shows the contents of the various registers after each complete step and compare operation (or every nine pulses of clock 1). Just prior to entering the table from the top, a clock (not shown) sets hammer latch 12 for hammer 1 as indicated in the timing chart of FIG. 2 as "Set LP1." The next clock pulse of clock 1 brings the first bit from image shift register 5 into comparison at Exclusive OR 11 with the first bit of data from the first character in data register 8. These bits are respectively 0 and 1; hence, a non-compare occurs, a signal is outputted from Exclusive OR 11, and the hammer latch 12 for hammer 1 is reset so that at the time a hammer fire signal is given by clock H, hammer 1 will not be fired. The next row in FIG. 4, moving downwards, shows that the data content in image shift register 5 and in data shift register 8 after each has been moved one bit to the left. A comparison is again made, and since a non-comparison occurs with the two leftmost bits, another reset signal would be produced by Exclusive OR 11. However, this additional reset signal is superfluous as the hammer latch 12 for print position 1 has already been reset by the previous non-comparison. Three more step and compare operations (a total of five comparisons including the first) are made. Then clock D inhibits shifting data register 8 for four additional pulses of clock 1 (a total of nine pulses of clock 1 have occurred). This brings to the output of image shift register 5 the data bit configuration as it appears starting from print position 2 and looking to the right. It should be remembered that after the fifth comparison the data register 8 is not stepped. This is to prevent the reading out of character 2 before a comparison cycle is ready to begin. The process is repeated after hammer latch 12 for print position hammer 2 is set, and it will be noticed that the first bit in image register 5 compares with the first bit in data register 8 this time. However, on the next comparison, a non-compare occurs and a reset pulse is applied to the latch 12 which was set and thus print hammer P2 will not be fired. It should be borne in mind that while the belt is actually moving during the time these comparisons are made, the comparisons occur at such a high speed that the belt does not move appreciably out of position in front of the print hammers. (In practice, the data bits on the belt might be skewed slightly ahead in time by physically putting the data bit slightly ahead of the characters to which they correspond so that by the time comparison is completed, the character will be squarely in front of the print hammer. This can also be accomplished by skewing the sensor relative to the characters.) This process is repeated for hammer latch 12 for hammers P3 and P4. It should be noted that hammer latch 12 for hammer P4 is not reset since a comparison occurs between the first five bits of data. Thqs also happens to be the 42nd step of clock 1 and a hammer fire signal H will be applied to all of the hammer latches 12, and those hammers for which latches 12 remain set will be fired. In this case, only hammer P4 will be fired since only its latch remains set. This means that the second "I" in "GIVING" will be printed at this time at print position 4. The next pulse of clock 1 is also coincident with a gate signal produced by clock 2 which brings a new bit into the image shift register 5 from belt 1. This is illustrated at the 41st step in FIG. 4 where the 0 bit is shown as going out of the register. It does not re-enter the register at the right because gate G2, under the influence of inverted signal from clock 2, is closed and the data bit is simply lost; the new bit from the belt taking its place in the right-most cell of image shift register 5. Eight additional steps of the image shift register 5 bring into position the image of the belt as it would appear shifted one character to the left in front of the print hammers. This is controlled by counter 17 in FIG. 1, together with the logic circuits shown; counter 15 is inhibited while image register 5 is stepped 8 more times. The comparison process now begins anew. Interestingly, the first 5 bits from image register 5 now compare with the first 5 bits from data register 8. Therefore, the hammer latch for the print position P1 will remain set so that hammer P1 will be fired at the next occurring hammer fire clock pulse from clock H. (This will print the "G.") It should be noted that the previous four complete comparisons of characters in data register 8 against bits from image shift register 5 resulted in circulating the data in data register 8 one complete cycle so that the "GIVI" appears again in the same order in which comparisons began. At the end of this comparison cycle of four characters, character "G" will be printed at print position 1. It can also be seen, that by extrapolation, the next four characters' comparison cycle will result in printing the first "I" and "GI I" will have been printed. Eventually, the character "V" will appear in the proper position in front of print hammer 3 and will also be printed, at which time all of the characters in data register 8 will have been printed and a new set of characters to be printed can be loaded into the register.

While the first embodiment of the invention has been discussed in relationship to a chain or belt printer, it can easily be seen that a similar string of data bits as appeared on the belt might be placed on any medium and that instead of designating characters by using five bit (or any desired number of bits) addresses, positions on the medium could be addressed using the same scheme. This lends itself to a variety of applications; for example, the data bits might be placed on a fixed index table on a machine tool and a movable carriage carrying a single data sensor could be used to scan the data bits until the desired position is found thus providing a signal for stopping the carriage. such an implementation avoids the problem in other positioning systems of converting digital data (as to desired location) into analog data for comparison with analog data from a position sensor since it can be accomplished directly. Incoming position codes can be entered directly into a register and compared bit by bit with an actual position which can be precisely described with great ease by simple timing marks on the medium. No counting, converting, or computation is required. If it is inconvenient, or for any reason undesirable, that physical or magnetic timing marks appear on the medium itself, a string of data bits in the sequence in which they would appear can be generated externally. Then the number of comparisons required to find a match between the desired location and the string of bits can be counted to indicate a given number of increments of movement which should be carried out to reach the desired location. This is the essence of the second embodiment of the invention illustrated in FIG. 5 which will now be discussed.

Figure 5:
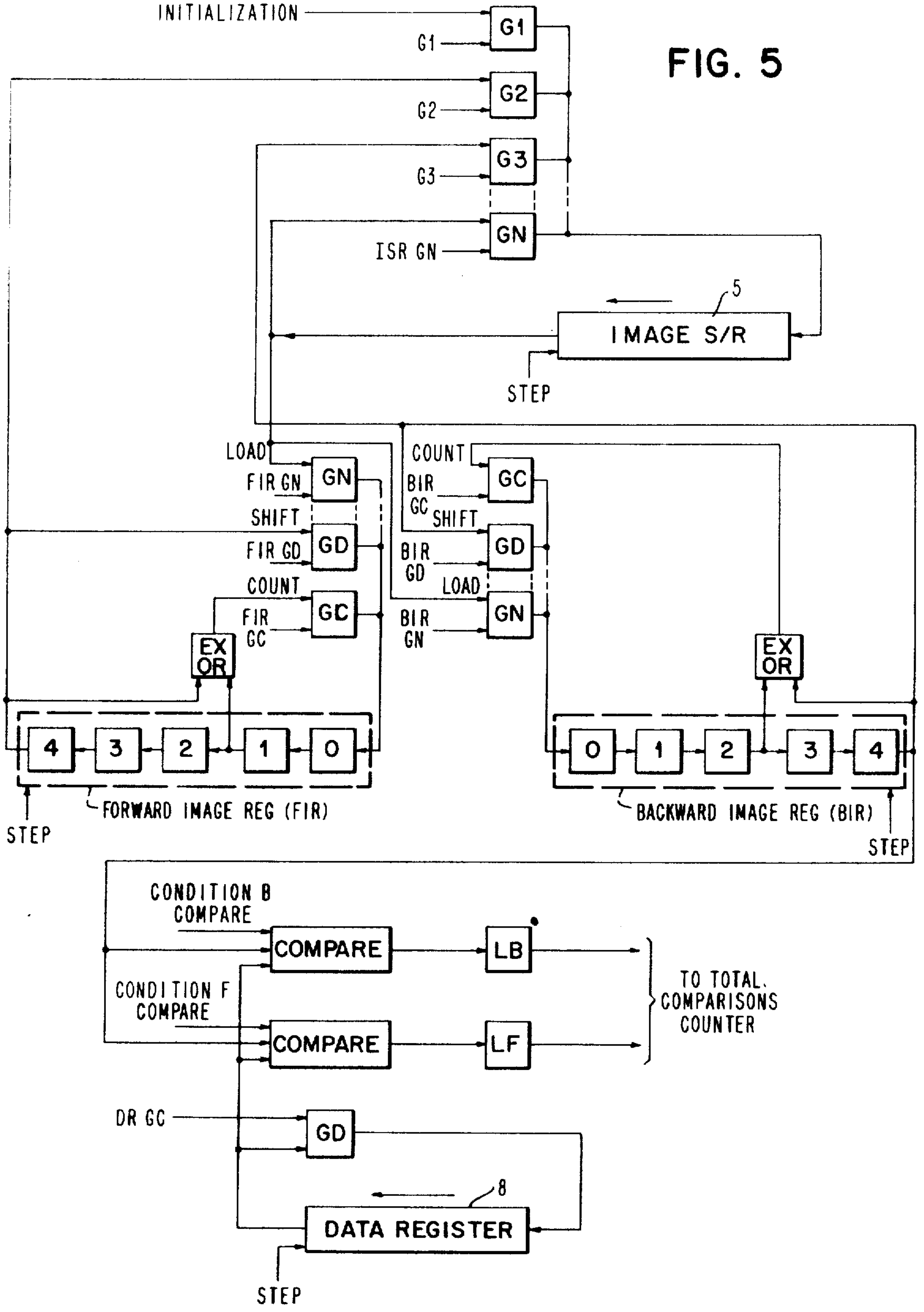
FIG. 5 illustrates in schematic form another embodiment of the invention as applied to bidirectional movable member.
Figure 7A:
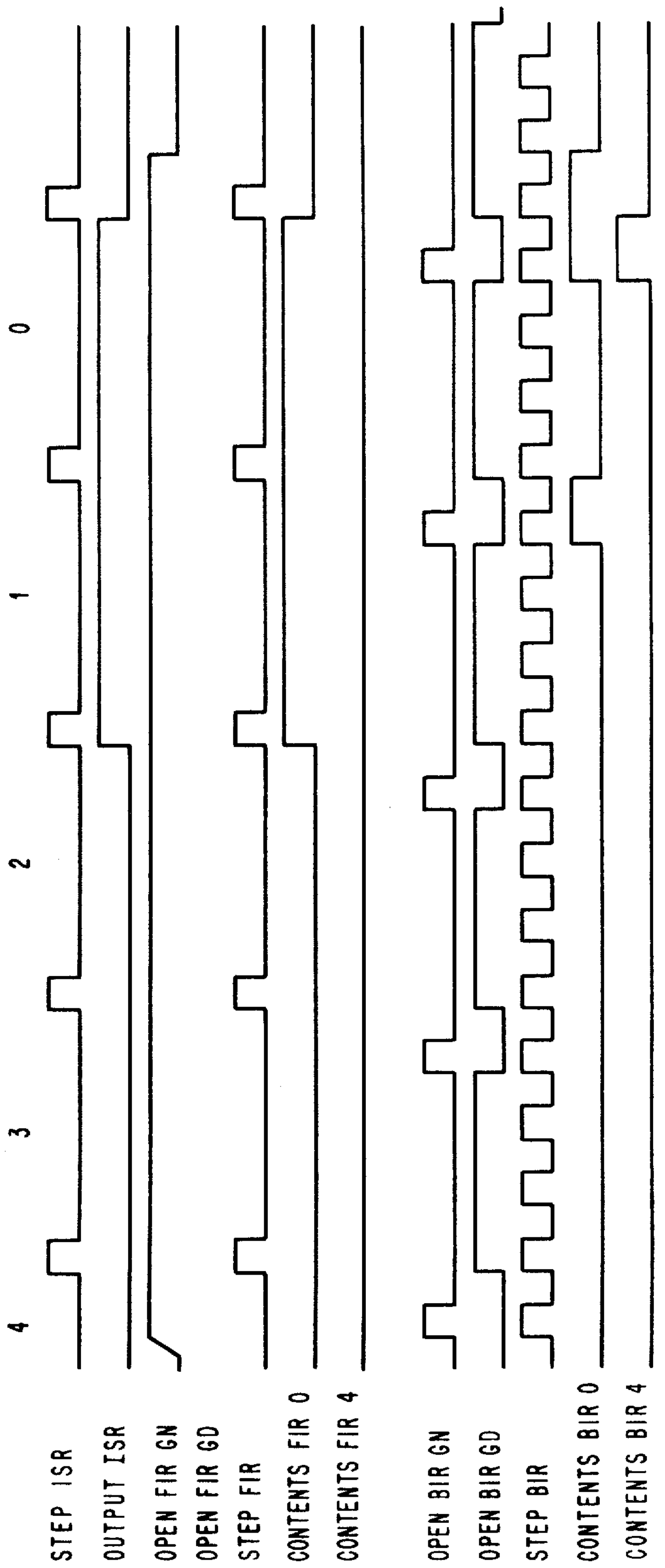
FIGS. 7A and 7B indicate the timing for the mechanism shown in FIG. 5.
Figure 7B:
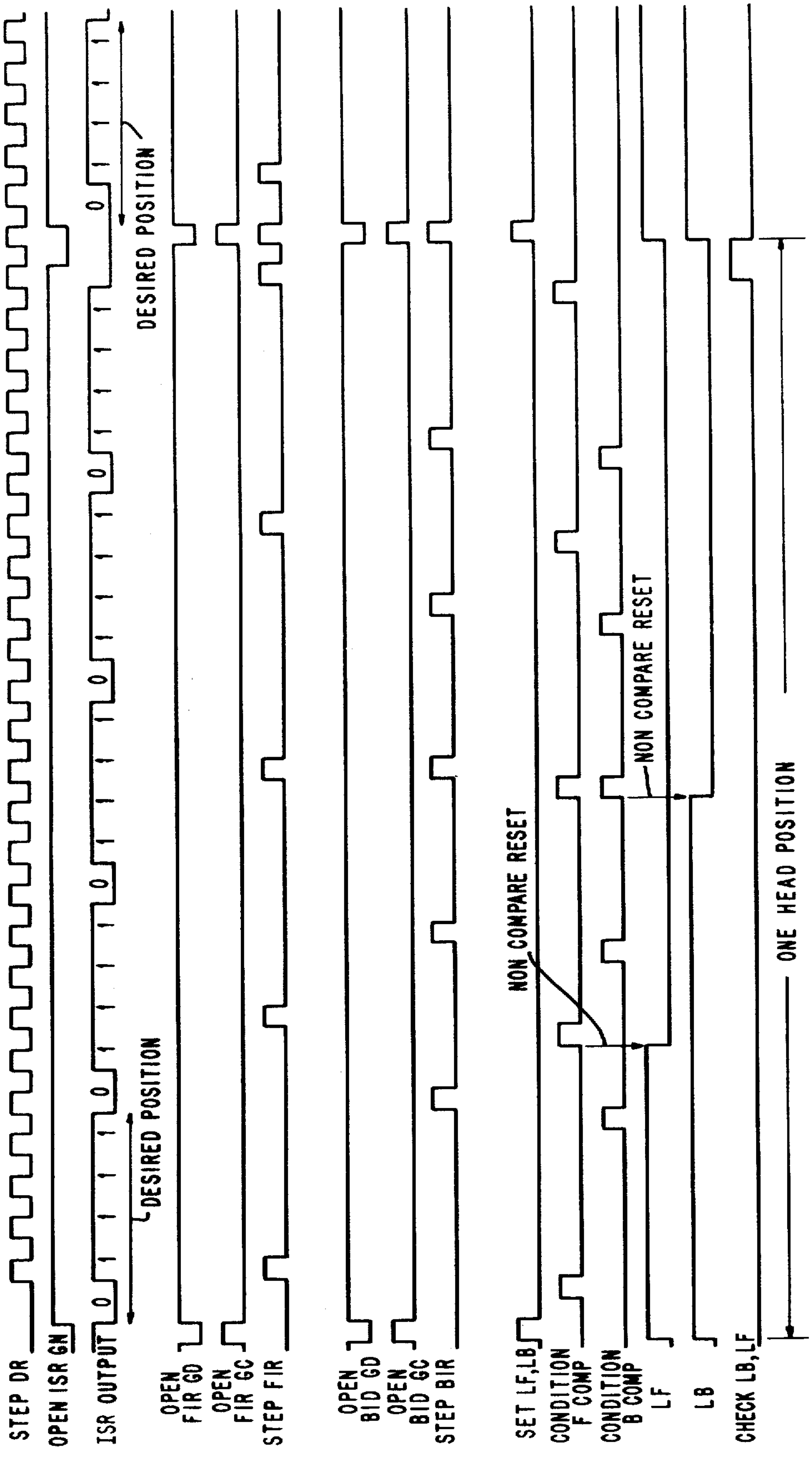

FIG. 5 illustrates an embodiment of the invention in schematic form as it might be applied to an indexible printing element or to any type of bidirectionally movable element. Shift registers 5 and 8 correspond to the previously discussed embodiment and various gating and timing arrangements are similar as well. A major difference is that the belt and its associated data bits is gone and in its place two code sequence generating feedback shift registers designated FIR and BIR are illustrated. These shift registers function in a fashion similar to shift register 5 except that the bit output from a given cell (other than the end cell) is taken and Exclusively OR'ed with the data coming from the end cell to create a new data bit which is inserted at the right as the registers are stepped. The timing of these various functions is indicated in FIGS. 7A and 7B. The clocks to produce the various timing and gating signals are well-known in the art, are similar to those in FIG. 1, and hence are not shown again. For purposes of clarity, FIR can be taken to stand for Forward Image Register and BIR for Backward Image Register. Image shift register 5 will be considered to contain the actual initial position of the movable element. This string of five bits (or however many are desired) is loaded through gates GN into the Forward and Backward shift registers. These registers are then stepped and compared to an open loop through gates GD against the data in data register 8 in a fashion similar to that in which image register 5 and data register 8 were compared in the previous embodiment of the invention. This comparison is done simultaneously and when a match is found between a string of 5 bits from the data register 8 and the string of code from either the Forward and Backward image registers, a latch is set which indicates the direction of travel required to go from the present position of the ball to the desired position. The number of complete five bit comparisons required to find the match is a number indicative of the number of positions which the bidirectional element must be moved to reach the desired location.

The initial data in image shift register 5 may be some prearranged initialization set of data representative of some "home position" for movable element. It may be inserted at start-up of the system when the power is turned on. A string of ones for example, might be loaded into the register as a start or, as a more typical example, the string of data bits shown in the middle of FIG. 6 might be loaded into the image shift register. This string of bits would then be loaded as shown in FIG. 6 into the Forward and Backward image registers while the element remains in a stationary position. The image registers would then be stepped to generate the string of code illustrated in FIG. 6. As indicated in the figure, and in FIG. 5, the output from the end cells of both the FIR and BIR registers is Exclusively OR'ed with the output of one of the other cells. For purposes of explanation, if a 1 appears in the end cell of, say the Forward Image Register, and also in the second cell, a step of the register will bring two ones to the Exclusive OR and, since they are the same, a zero will be generated to be entered into the first register cell, cell 0, in the Forward Image Register. The same is true of the Backward Image Register, but its feedback is taken off at a different stage so that the code generated presents an image of the medium moving in a direction opposite to that being generated by the Forward Image Register. It can thus be seen that each additional step of the Forward and Backward Image Registers in the closed loop mode through gates GC, produces a new string of 5 bit codes which may then be serially compared against the desired location code in the data register 8. When a match is found, the appropriate forward or backward latch can be set and a signal given to a drive system to move the element in the appropriate direction by a number of increments equal to the number of steps of the Forward or Backward Image Register involved which were required to find the match. Thus, the shortest path from the present position of the element to the new desired position in either the forward or backward direction of movement can be located without returning to a home position. When the new desired location is reached, the address from the data register 8 (the desired address just located) can be loaded into the image shift register 5 as the new starting point for generating a new string of code. When this address is loaded into the Forward and Backward shift registers on the next cycle, a new string of code will be generated. The applicability of this embodiment of the invention to a variety of mechanical positioning systems will be instantly obvious to those of skill in the art since the bidirectional positioning problem is the same as that experienced in a variety of fields. The requirement of counting up the number of comparisons before a match is found, while it amounts to a new step and is somewhat of an inconvenience, is easily overshadowed by the benefit of being able to tell which direction the medium should be moved by the shortest path to reach the new desired location. As shown in FIG. 5, there is an alternative to actually counting the number of comparisons and then moving the element by a corresponding number of increments in the indicated direction: when a match is detected, the string of code in the FIR or BIR which indicated a match during the open loop shift and compare operation may now be unloaded and image shift register 5 contents, the original starting point, may be loaded into the FIR and BIR, the print element may be set in motion at a rate of one increment per comparison in the desired direction, and the content of the data shift register can be compared against the output of the FIR and BIR until a match is again detected, at which point the desired location has been reached. This is identical to the original comparison routine except that the movable element is in motion during the comparison.

ADVANTAGES

The embodiments shown illustrate several of the basic advantages of this invention. The coding scheme used, which assigns only one data bit to each position location, is a great simplification in coding techniques applied to positioning systems, and it facilitates the removal of much surplus circuitry, extra sensors, and the inherent unreliability of a more complicated system. In addition, as applied in the invention, the coding scheme used facilitates the control of multiple printing hammers by a single sensor or, alternatively, if multiple hammers are not the object of control, multiple positions between two fixed points on a movable medium can be identified and digital actuators can be operated to reach those locations in increments as fine as desired without having the delicate and sensitive position encoder devices utilized previously. The use of digital logic and digital signals throughout in the application of this invention is inexpensive in comparison to a variety of other systems utilized since the digital logic devices and elements are now available off the shelf for a variety of standard functions.

Having thus described our invention in its relation to two specific embodiments, it will be obvious to those of skill in the art that many modifications of the specific embodiments and the circuitry used to carry out the functions which embody the invention may be implemented in a variety of equivalent ways without departing from the spirit and scope of the invention.

What is claimed is:

1. A method of indicating the present position of any location on a movable medium having a plurality of locations thereon, comprising the steps of:
- assigning to each said location on said medium a coded location address comprised of a plurality of data bits, said plurality of data bits including at least one data bit from an adjacent location address on said medium;
- entering a coded address identity for a selected location for which a present position indication is desired into a first means for storing data;
- generating a series of successive data bit signals in the sequence in which said bits are assigned to said locations on said medium;
- storing a plurality of said successive bit signals in a second means for storing data;
- comparing the contents of said first and second said storage means during the time between entries of each new bit signal into said second storage means until a match is found between a plurality of successive bits in said first and second storage means, said plurality of bits being of sufficient number to make at least one said assigned coded address identity; and
- signaling the occurrence of such a match, said signal being indicative of the present position of said given location on said medium relative to a fixed point.

2. The method of claim 1, wherein said generating step comprising steps of:
- entering data bits forming a given said coded address into a means for cyclically generating a series of bits to form coded addresses in the order in which said addresses identify said locations on said medium starting from the location identified by said entered bits; and
- generating a new bit before each said comparison to form a new address for said comparison.

3. The method of claim 1, wherein said generating step comprises steps of:
- placing said data bit information in machine sensible form on said movable medium; and
- sensing said data for entry into said first storage means.

4. The method of claim 3, wherein:
- said data bit information is placed in magnetically sensible form on said medium.

5. The method of claim 3, wherein:
- said data bit information is placed in optically sensible form on said medium.

6. Apparatus for indicating the present position of a location on a movable medium, comprising in combination:
- at least one machine sensible data bit on said medium at each location to be identified;
- means positioned in cooperation with said movable medium for sensing said data bits as said medium moves;
- first means connected to said sensing means for temporarily storing data bit information read by said sensing means;
- second means for storing information representative of a plurality of data bits;
- means connected to said second means for entering a coded address for a desired location on said medium into said second storage means, said coded address comprising a plurality of said bits and including said data bit assigned to said location and said data bit assigned to at least one adjacent location;
- means, connected to said first and second storing means for comparing the data contents of said first storage means with the contents of said second storage means and for signaling the result of said comparison, said signal being indicative of whether the desired position has been sensed by said sensing means.

7. Apparatus for indicating the present position of a location on a movable medium, comprising in combination:
- means for generating a series of successive coded addresses in the sequence in which said addresses are assigned to said locations on said medium;
- first means connected to said generating means for temporarily storing said generated addresses;
- second means for storing data bit information;
- means connected to said second means for entering a coded address for a desired location on said medium into said second storage means, said address comprising a plurality of data bits and including at least one bit assigned to said desired location and at least one bit assigned to at least one adjacent location; and
- means connected to said first and second means for comparing the data contents of said first storage means with the contents of said second storage means and for signaling the result of said comparison, said signal being indicative, when taken in conjunction with the count of the number of such comparisons made when a match is detected between the data contents of said first and said second storage means of the present position of the location for which position information is desired; and means connected to said comparing means for counting the number of said comparisons required until a match is found between the contents of said first and second means.

8. Apparatus as described in claim 7, in which said generating means comprises:

a feedback shift register means for storing said bits forming a given coded address and for generating a new series of bits each time said shift register is shifted.

9. Apparatus for indicating the present position of a given location on a bidirectionally movable medium, said location having a coded location address comprised of a plurality of data bits, at least one data bit being assigned to each said location, comprising:

means for temporarily storing an entered address of a desired location comprising a plurality of data bits and including said data bit assigned to said desired location and said data bit assigned to at least one location adjacent said desired location, said address being a coded address representative of a given location on said bidirectionally movable medium;

means for generating a series of successive addresses in the sequence in which said addresses are assigned to said locations on said medium in both directions of movement from a given starting point;

second means connected to said generating means for storing said generated addresses; and means connected to said first and second storing means for comparing the data contents of said first storage means with the contents of said second storage means and for signaling the result of said comparison, said signal being indicative, when taken in conjunction with the count of the number of such comparisons made when a match is detected between the data contents of said first and said second storage means of the present position of said location for which position information is desired; and means connected to said comparing means for counting the number of said comparisons required until a match is found between the contents of said first and second means.

10. Apparatus as described in claim 9 in which said generating means comprises:

a feedback shift register means for storing said bits forming a given coded address and for generating new bits to form a new series of bits each time said shift register is shifted.

* * * * *